(No Model.)
W. N. LITTLE.
BOILER TUBE STOPPER.
No. 458,304. Patented Aug. 25, 1891.
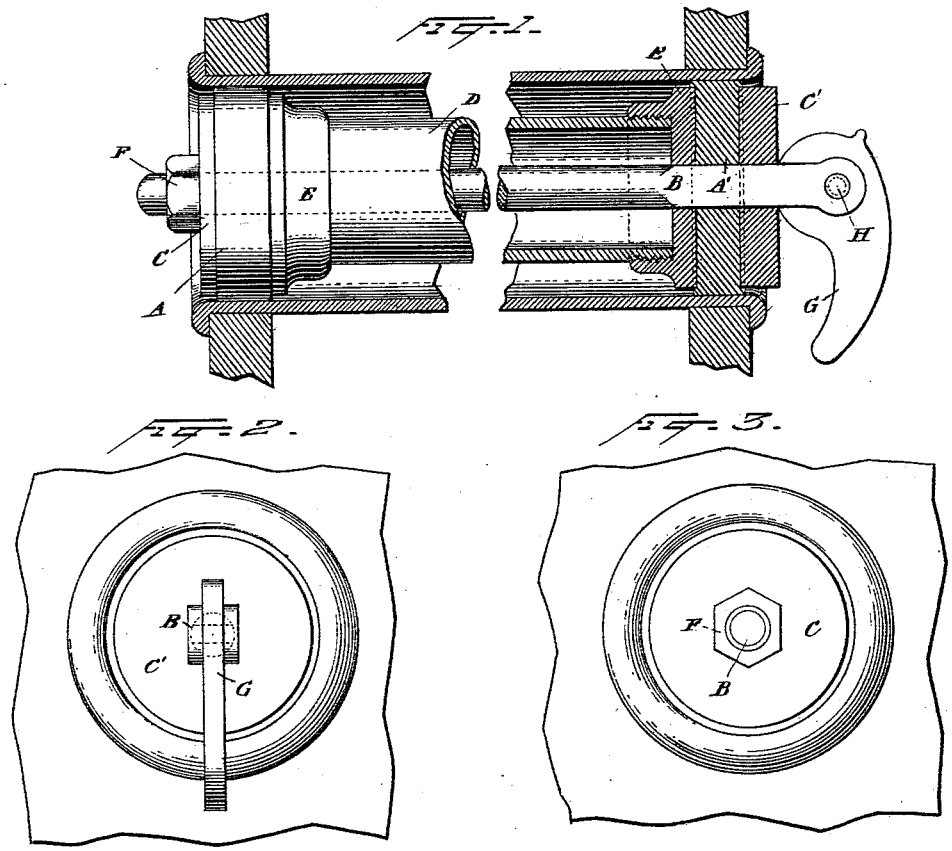
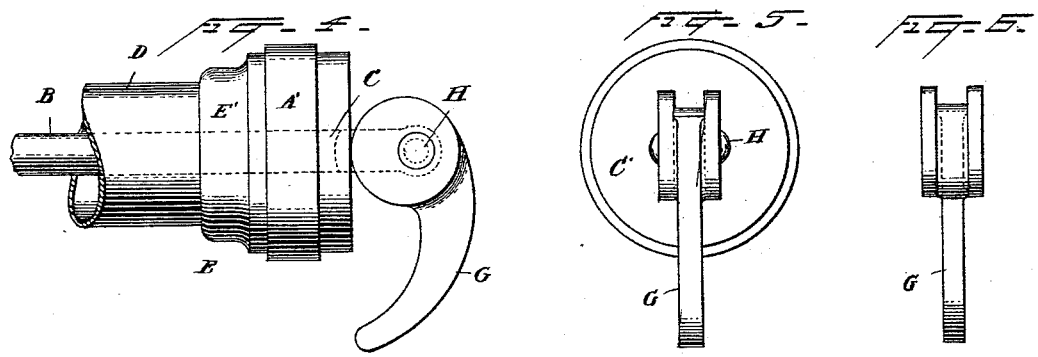
Witnesses
Morris L. Clark.
N. F. Oberly
Inventor
William N. Little,
By his Attorneys
Dyer & Seely.

UNITED STATES PATENT OFFICE.

WILLIAM NELSON LITTLE, OF ANNAPOLIS, MARYLAND.

BOILER-TUBE STOPPER.

SPECIFICATION forming part of Letters Patent No. 458,304, dated August 25, 1891.

Application filed August 28, 1889. Serial No. 322,207. (No model.)

*To all whom it may concern:*

Be it known that I, WILLIAM NELSON LITTLE, a citizen of the United States, residing at Annapolis, in the county of Anne Arundel and State of Maryland, have invented a new and useful Tube-Stopper for Stopping Leaks in Boiler-Tubes, of which the following is a specification.

My invention relates to improvements in tube-stoppers in which two disks of pure rubber or other suitable substance placed between metallic disks, with a rigid middle structure between them, are placed within the tube to be stopped and compressed so as to fit tightly and prevent leakage from the interior of the tube. The compression of the elastic disks to be effected by means of a cam at one and a nut at the other end of a rod passing through the system.

I attain the objects by the mechanism illustrated in the accompanying drawings, in which—

Figure 1 is a longitudinal elevation of the apparatus, showing a portion of the uniform middle structure removed. Figs. 2 and 3 are opposite end views. Figs. 4, 5, and 6 are views of a slightly modified construction.

Similar letters refer to similar parts throughout the several views.

Elastic packing-disks of a suitable substance A A', usually of gum-caoutchouc, (asbestus may be employed,) are made of a size slightly smaller in diameter than that of the tube to be plugged, and have a central hole in each of a diameter equal to that of the ends of the tie-rod B. The tie-rod B may be made with larger ends than at its middle to provide ample strength where required. Metallic disks C C' are of equal or slightly smaller diameter than that of the elastic disks and are placed outside the latter, as shown. A metal pipe D, (gas-pipe being commonly used,) having its ends flanged, or disks similar to C C' secured thereon, (shown at E E',) is placed between the disks A A', as shown in Fig. 1. The tie-rod B, having a nut F at one end and a cam G at the other, passes centrally through and ties the whole. The cam G is secured in place by and revolves on a pin H, passing through the end of the rod B, so that the pin H is eccentric to the curvature of the working edge of the cam G. In the drawings, Figs. 1, 2, and 3, the cam is represented as in a slot formed in the end of the tie-rod B, and its working edge bears against the edges of the hole in the disk C', these edges being slightly beveled to prevent excessive abrasion of the surfaces in contact. I do not confine my invention to the employment of a flat cam in a slot, as shown. The cam may be forked to straddle the end of the tie-rod B, and thus avoid cutting away material of the latter for slot, as shown in Figs. 4, 5, and 6. I prefer, however, to make the end of the tie-rod of sufficient diameter to permit slotting without excessive weakening of the parts.

To use the stopper, place the arm of the cam horizontal or so as to relax the parts, adjust the nut F to bring all parts together with tension sufficient to compress the soft disks A A', causing them to fit neatly within the tube to be plugged, insert the whole until the disk C' is nearly flush with the end of the tube, then drive the arm of the cam G to a vertical position, which act causes compression of the disks A A' and corresponding enlargement thereto diametrically, thus effectually plugging the tube at both ends simultaneously.

I am aware that a tube-stopper having disks of rubber arranged to be compressed by a nut at each end of the tie-rod has been in use for a few years; but it was unsatisfactory, because of the difficulty of setting up the nuts without turning the tie-rod itself. I do not claim such a combination broadly; but

What I claim as my invention, and desire to secure by Letters Patent, is—

1. In a tube-stopper, the combination, with disks, of elastic material held between metal disks, a rigid separating structure located between the metal disks on the inner sides of the elastic disks, a tie-rod passing through all the disks, and a cam acting to shorten the tie-rod between the outer metal disks, whereby the elastic disks will be simultaneously expanded, substantially as set forth.

2. In a tube-stopper, the combination, with disks, of elastic material held between metal disks, a rigid separating structure located between the metal disks on the inner sides of the elastic disks, a tie-rod passing through all the disks, a nut on one end of the tie-rod for setting the disks together, and a cam on the other end of the tie-rod for expanding the elastic disks, substantially as set forth.

WILLIAM NELSON LITTLE.

Witnesses:
R. GATEWOOD,
D. W. TAYLOR.